United States Patent [19]

Matsui et al.

[11] 3,855,485

[45] Dec. 17, 1974

[54] GROUND COIL ASSEMBLY OF A LINEAR INDUCTION MOTOR WITH D.C. LEVITATING ARMATURE FOR HIGH SPEED VEHICLE

[75] Inventors: Kazumi Matsui; Takashi Umemori, both of Tokyo; Masahiko Toyoshima, Hitachi; Kozo Katakami, Hitachi; Susumu Osawa, Hitachi, all of Japan

[73] Assignees: Hitachi Cable Limited; Japanese National Railway, both of Tokyo, Japan

[22] Filed: June 11, 1973

[21] Appl. No.: 368,929

[30] Foreign Application Priority Data
June 10, 1972  Japan.............................. 47-57347
July 28, 1972  Japan.............................. 47-75034

[52] U.S. Cl.............. 310/13, 104/148 LM, 318/135
[51] Int. Cl. ............................................ H02k 41/02
[58] Field of Search ............. 104/148 LM, 148 MS; 310/12–14; 318/121, 135

[56] References Cited
UNITED STATES PATENTS
3,407,749  10/1968  Frig................... 318/135 X
3,771,033  11/1973  Matsui et al...................... 310/13 X
3,806,782  4/1974  Matsui et al...................... 310/13 X

*Primary Examiner*—Gerald Goldberg
*Attorney, Agent, or Firm*—Sughrue, Rothwell, Mion, Zinn & Macpeak

[57] ABSTRACT

A ground coil assembly of a DC linear motor for use in a high speed vehicle, comprises a fixed, levitating and driving armature coil including coil elements of two or more phases which are arranged to have a structural phase shift of $2\pi/n$ from each other where $n$ is the number of phases of the fixed armature coil. The ground coil assembly may further comprise a fixed induction coil including many coil elements which have the same length as that of the coil elements of the fixed armature coil. The coil elements of the fixed induction coil are respectively arranged to have a structural phase shift of $2\pi/2n$ with respect to each of the fixed armature coil elements. These coil elements of the fixed armature coil may preferably be arranged in a vertically inverted manner.

3 Claims, 7 Drawing Figures

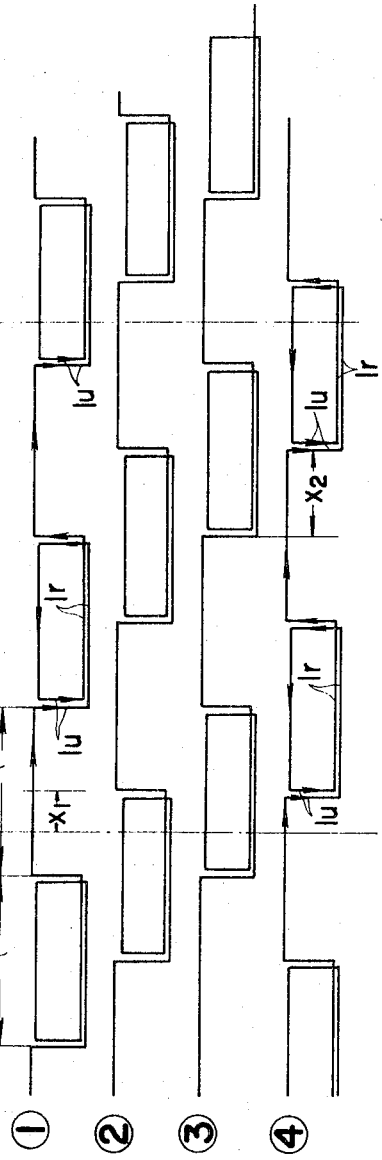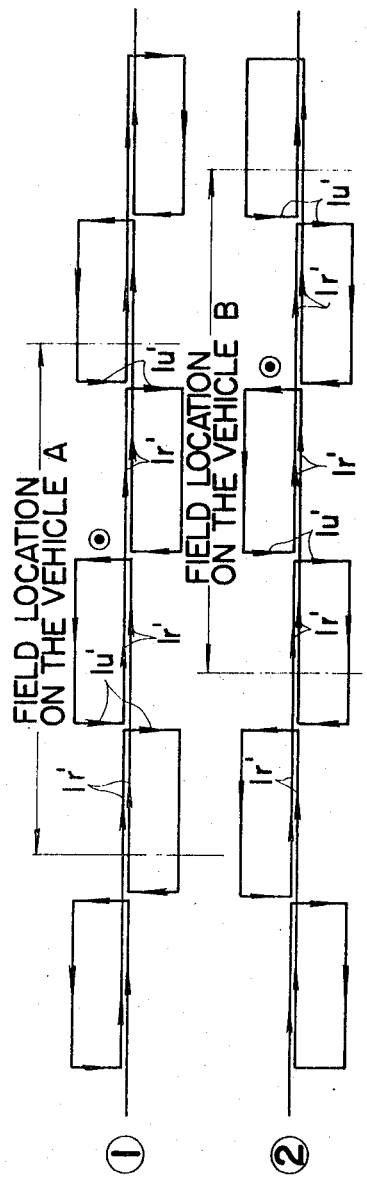

GROUND COIL ASSEMBLY OF A LINEAR INDUCTION MOTOR WITH D.C. LEVITATING ARMATURE FOR HIGH SPEED VEHICLE

BACKGROUND OF THE INVENTION

1. Field of the Invention

The present invention relates to a DC linear motor for a high speed vehicle such as a high speed train, and, more particularly, to an improved arrangement of the fixed, levitating and driving armature coil of a ground coil assembly for use in the DC linear motor of the above type.

2. Description of the Prior Art

Generally speaking, a DC linear motor for a high speed vehicle is known to include, as its driving system, a field system accommodated in a vehicle body and a ground coil assembly installed on the ground. U.S. Pat. No. 3,771,033 is representative of such motors. The ground coil assembly includes, as customary, a fixed levitation and driving armature coil and a fixed induction coil. With these structural elements, the high speed vehicle under discussion is required to have a speed performance of about 500 km/hour and to offer a safe and comfortable ride to the passengers. In order to meet these requirements, the lift to be applied to the vehicle body should be uniform during its running operation. High speed vehicles presently being developed cannot, however, obtain such uniform lift.

SUMMARY OF THE INVENTION

It is, therefore, a major object of the present invention to provide an improved ground coil assembly of a DC linear motor for a high speed vehicle, which coil assembly can provide a uniform lift to the vehicle.

Other objects and advantages of the present invention will be apparent from the description taken in conjunction with the accompanying drawings, in which:

BRIEF DESCRIPTION OF THE DRAWINGS

FIG. 2 is a developed plan view showing the arrangement of a fixed armature coil according to the present invention;

FIG. 5 is a similar view to that of FIGS. 2 and 3 but showing still another embodiment of the invention.

DESCRIPTION OF THE PREFERRED EMBODIMENTS

Figure 1:
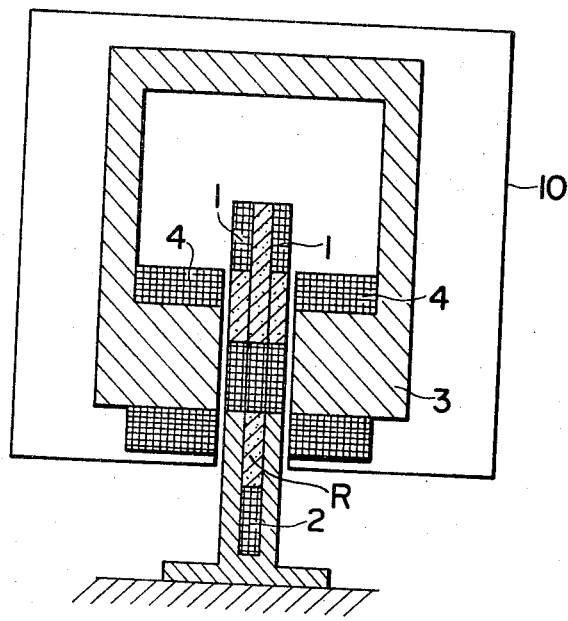
FIG. 1 is an explanatory sectional, elevational view of the general structure of a DC linear motor.

Referring now to FIG. 1, the field system 3, accommodated in a vehicle body 10, is magnetized by the field coil 4, accommodated in the vehicle body 10, so that when a DC current is supplied to the fixed levitation and drive armature coil 1 the vehicle body 10 is subject to the lift and driving force by the combined action of the magnetic field established by the field system 3 to which a D.C. current is supplied, and of the electric current passing through the fixed armature coil 1. The fixed induction coil 2, which constitutes the ground coil assembly together with the fixed armature coil 1, is composed of short-circuited windings and is disposed at a lower level than the fixed armature coil 1. As a result, the fixed induction coil 2 will impart the lift to the vehicle body 10 by the electromagnetic force, which in turn is built up by the induction current established therein in response to the movement of the vehicle body 10 and by the electromagnetic field established by the field system 3. The interactions of these forces are known quite well in the art as described in detail in U.S. Pat. 3,771,033, and as such its detailed discussion will be omitted here.

A first embodiment of the present invention will be described with reference to FIG. 2, in which the fixed levitation and drive armature coils 1 has phases numbers ①②③and④ for illustrative purposes only. Here, the coil elements of the fixed armature coil 1 and the fixed induction coil 2 may have any suitable shape and number of turns, but are preferably formed so as to be of rectangular shape by turning flat insulated wire several times, in this instance. As shown, one row of the fixed armature coil windings has elements arranged in a manner such that they are spaced apart from each other by a distance equal to the length or winding pitch of one of the elements. Another row, of different phase, is arranged to have its elements interposed or overlapped between any adjacent pair of the coil elements of said one row forming a given conduction pitch between vertical adjacent conductors of coil elements of respective phases. More specifically, the coil elements of the four rows ①②③and④ are arranged to have an interval of $2\pi/n = \pi/2$ between each other.

With these construction arrangements, the lift or levitation is established by the electromagnetic interaction between the electric current $I_r$ passing through the horizontal lower side of the fixed armature coil elements and the electromagnetic field built up on the vehicle body. On the other hand, the driving force is also established by the electromagnetic interactions between the electric current $I_u$ passing through the vertical side of the armature coil element and the electromagnetic field built up on the vehicle body. Again, this interaction is detailed in the referred to patent. In order to obtain the lift and the driving force simultaneously, two rows of coil elements of different phase are supplied with electric currents having phase difference of $\pi/2$, at any instant. For example, the coils of row numbers ①and④ are supplied with the electric currents $I_r$ and $I_u$, when the field system is located at the position shown, while no electric current is applied to the coil elements of row numbers ②and③. If, in this instance electric currents are also applied to the coil elements of row numbers ② and ③, there will be generated other driving forces which have just the opposite direction to those of the coil elements of row numbers ① and ④. Thus, electric currents are supplied to the coil elements in accordance with a sequence such that the lift and the driving force of the same direction can be obtained simultaneously to drive the vehicle body forward.

In these ways, the lift can be established at any longitudinal position of the ground coil assembly without interruption by arranging the elements of each row of the fixed, levitation and drive armature coil at a given structural spacing to provide a structural phase shift or conductor pitch of $2\pi/n$ and by changing applications of electric currents to the each row of the fixed armature coil of different phase in a predetermined sequence.

The ground coil assembly of the first embodiment has, however, a drawback that the lift is considerably reduced at the end portions of each of the fixed armature coil elements, which phenomenon is also found in the induction coil elements. In order to obviate this drawback, an improved arrangement is proposed in the second embodiment of the invention, which also derives uniform distribution of the obtainable lift.

Figure 3:
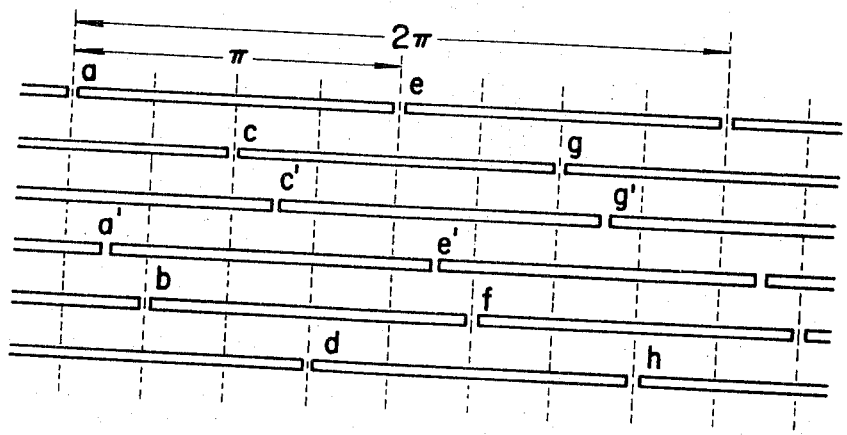
FIG. 3 is a developed plan view showing as another embodiment of the invention the arrangements of a fixed armature coil and an induction coil.

Turning now to FIG. 3, reference letters $a$, $b$, $c$, $d$, $e$, $f$, $g$, and $h$ respectively designate the coil elements constituting the fixed armature coil, while reference letters $a'$, $c'$, $e'$, and $g'$ designate each of the coil elements constituting the fixed induction coil. As has been shortly touched, the armature coil elements $a$ to $g$ and the induction coil elements $a'$ to $g'$ are usually produced by turning the flat insulated wire several times to form a coil of rectangular shape, and by subsequently molding the shaped coil elements with use of a synthetic resin having a high mechanical strength, such as an epoxide resin, as shown by reference letter R in FIG. 1.

In the embodiment of FIG. 3, the fixed armature coil has eight phases that is, eight coil elements per winding pitch (that is, $n=8$), and the fixed conduction coil is arranged as two rows of coil elements. The phase angle of the armature coil is such that for example, coil elements of $a$ and $e$ of the same phase have a structural phase shift or conductor pitch of $2\pi$ therebetween, and the eight coil elements $a$ to $h$ for all phases are displaced from each other by a structural phase shift or conductor of $2\pi/n = 2\pi/8 = \pi/4$.

On the other hand, the induction coil elements, $a'$, $c'$, $e'$, and $g'$ have the same length as that of the armature coil elements $a$ to $h$ and are structurally phase shifted from the corresponding armature coil elements by the distance of $2\pi/2n$, namely $2\pi/16 = \pi/8$. More specifically, the induction coil elements $a'$, $c'$, $e'$, and $g'$ correspond respectively to the armature coil elements $a$, $c$, $e$ and $g$ and are shifted therefrom in terms of conductor pitch by the distance of $\pi/8$.

By these arrangements, the ground coil assembly of the second embodiment is free from any vertical overlapping of the vertical sides of the fixed armature and induction coil elements at any horizontal point. Thus, the longitudinally local reduction in the lift can be prevented to provide a uniform distribution of the lift.

Moreover, FIG. 3 shows the division between all of the fixed armature coil elements. Practically, each coil element in the same phase is electrically connected together for the fixed armature coil of FIG. 2.

As to the longitudinal distribution of the lift, more detailed explanation will be made by referring to FIG. 2. As shown, the lift is established at the horizontal lower sides of the fixed armature coil elements of ① and ④ phases to which the electric currents are applied. On the contrary, those portions of the ground coil assembly, where the fixed armature coil elements to which the electric currents are applied do not exist, establish no lift. As a result, the strength of the lift will fluctuate in response to the position of the moving vehicle body. In other words, the positions designated by the longitudinal lengths $X_1$ and $X_2$ are not subject to the lift. In this way, the length to which the lift of the fixed armature coil elements is given will cyclically change in response to the movement of the field system of the vehicle body, so that the strength of the lift itself will accordingly fluctuate, as is shown in FIGS. 4a, 4b and 4c.

Figure 4A:
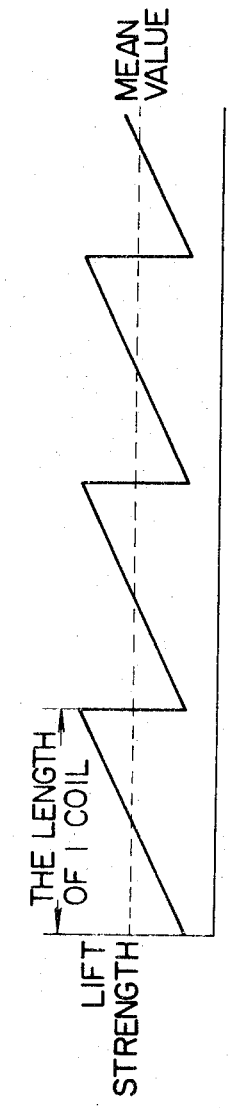
FIG. 4a is a graphical presentation of variations in the lift against relation of a movement of a field system on the vehicle body and an electric current to be supplied to a fixed armature coil having two phase coil elements.
Figure 4B:
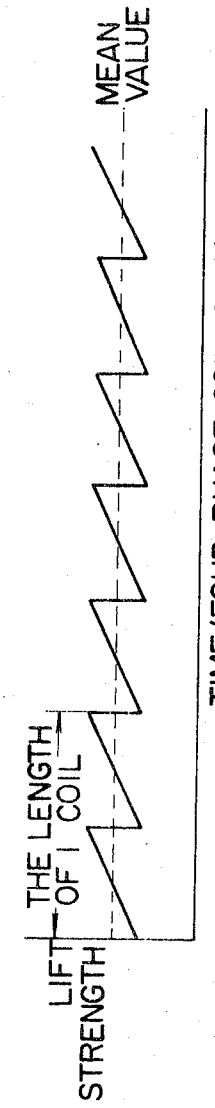
FIG. 4b is a graphical presentation of variations in the lift against relation of a movement of a field system on the vehicle body and an electric current to be supplied to a fixed armature coil having four phase coil elements.
Figure 4C:
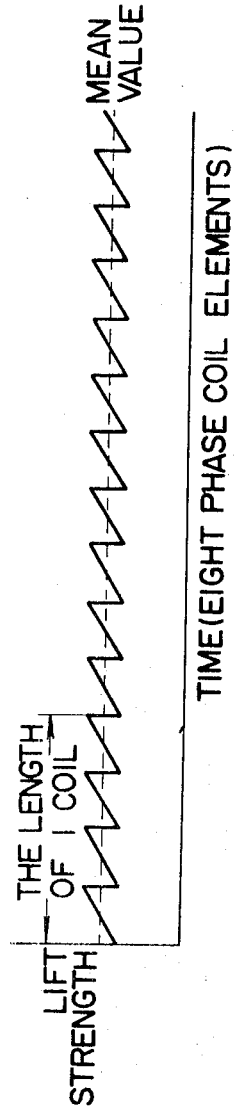
FIG. 4c is a graphical presentation of variations in the lift against relation of a movement of a field system on the vehicle body and an electric current to be supplied to a fixed armature coil having eight phase coil elements.

It will be apparent from the consideration of FIGS. 4a, 4b and 4c that the fluctuation of the lift becomes the larger as the number of phases of the fixed armature coil is reduced. According to the conventional technical concept, therefore, the number of phases of the armature coil should have a quite large value if it is intended to reduce the variation in the lift. Moreover, such pulsations in the lift cannot be reduced to zero, although the value itself can be minimized. On the other hand, the driving force to be applied to the vehicle body will also vary with the vertical displacement of the field system on the vehicle body.

These drawbacks can be obviated by the third embodiment of the ground coil assembly according to the present invention, which will be described with reference to FIG. 5.

In this embodiment the fixed armature coil is composed of many coil elements of the two phases ① and ②. The armature coil elements of the two phases ① and ② are arranged to have a structural phase shift or conductor pitch of $2\pi/n = \pi$. In an armature coil for each phase, the coil elements inversely wound each other and are arranged with different height in the vertical direction, shifting at every coil element. With these arrangements, the lift is imparted to the whole length of the field system on the vehicle body, so that the strength of the lift itself will not change even if the field system moves relative to the fixed armature coil.

In more detail, when the field system of the vehicle body is located at the position A, let it be assumed that electric currents are supplied to the armature coil of phase ① in the directions of the arrow as shown. Then, the lift is established by the combined interactions of the electromagnetic field of the field system, as shown in the arrows, and of the rightward electric currents $I_r'$ passing through the lower and higher horizontal sides of the armature coil elements. The driving force is also established in the rightward direction by the combined interactions of the electromagnetic field of the field system and of the downward currents $I_u'$ passing through the vertical sides of the armature coil elements.

When, on the contrary, the field system of the vehicle body is moved to the position B, the supply of the electric current is changed from the armature coil of phase ① to the coil of phase ② as shown by the arrows. Then, the lift is established by the electromagnetic force which is produced by the interactions of the magnetic field of the field system (in the direction as shown) and of the electric currents $I_r'$ rightwardly flowing in the upper and lower horizontal sides of the armature coil elements, while the rightward driving force is established by the electromagnetic force which is produced by the interactions of the particular magnetic field and the of the electric currents $I_u'$ downwardly flowing in the vertical sides of the armature coil elements.

In these ways, it should be appreciated in the third embodiment that the lift is imparted to the whole length of the field system and that the strength of the lift itself will not change with the presence of the relative movement of the field system to the fixed armature coil. It should also be appreciated as a resultant feature of the invention that the multi-phase arrangements of the fixed armature coil, which have been indispensable for reducing the pulsating change of the lift, are unnecessary.

As is apparent from FIG. 5, on the other hand, since the driving force is produced by the electric currents passing through the vertical sides both of the lower and upper armature coil elements, the level of the driving force is kept constant even at the presence of the variation in the vertically relative position of the field system on the vehicle body to the fixed armature coil.

The ground coil assembly according to the present invention should further be appreciated in that the fixed armature coil can have a considerably reduced number of phase for the same performance. As a result, the ends of the coil elements are markedly simplified in their configurations and the connecting operations of them are also simplified. And, the required power source system and the control circuit systems are also simplified. The present ground coil should further be appreciated in that the lift performance is highly improved since the lift itself is established along the whole length of the field system.

What is claimed is:

1. In a ground coil assembly of a D. C. linear motor for a high speed vehicle, wherein said linear motor is of the type wherein the vehicle has movable magnetic fields disposed such that the magnetic flux generated is perpendicular to the current loop of the fixed armature windings of the ground coil assembly and cuts across vertical and horizontal conductors of the fixed armature windings, and wherein the fixed armature windings consist of rectangular current loops having vertical and horizontal conductors, aligned continuously along the path of travel of the moving vehicle, and a relative lift is developed between the horizontal conductors of the fixed armature windings and the movable magnetic field and at the same time a relative drive is developed between the vertical conductors of the fixed armature windings and the moving magnetic field to thereby cause the vehicle to be suspended and propelled along the path, the improvement wherein:

the fixed armature windings of the ground coil assembly comprises a coil which includes a multiplicity of coil elements of at least two electrical phases arranged with a conductor for respective phases of $2\pi/n$ relative to each other, and said ground coil assembly further comprises a fixed induction coil which includes a multiplicity of coil elements of the same winding pitch as that of the coil elements of the fixed armature coil, with the coil elements of the fixed induction coil having a conductor pitch of $2\pi/2n$, wherein n is the number of phases of said armature coil.

2. In the ground coil assembly as claimed in claim 1, the further improvement wherein the adjacent coil elements for each phase of said fixed armature windings are wound inversely to each other and are arranged at different vertical heights.

3. In a ground coil assembly for a D. C. linear motor for a high speed vehicle of the type wherein the vehicle is provided with movable magnetic fields, said ground coil assembly includes fixed armature windings which consist of rectangular current loops having vertical and horizontal conductors, aligned continuously along the path of travel of said vehicle, said movable magnetic fields are disposed such that the magnetic flux generated is perpendicular to the current loops of the fixed armature windings and cuts across the vertical and horizontal conductors of said fixed armature windings, and whereby a relative lift is developed between the horizontal conductors of the fixed armature windings and said movable magnetic fields, and at the same time a relative drive is developed between the vertical conductors of the fixed armature windings and the movable magnetic field, thereby causing the movable vehicle to be suspended and propelled along said path, the improvement wherein:

said fixed armature coil winding comprises a multiplicity of coil elements of at least two electrical phases, with said coil elements for each phase having a conductor pitch of $2\pi/n$ relative to each other, wherein $n$ is the number of phases of said armature coil, and wherein adjacent coil elements are inversely wound relative to each other and are of different vertical height.

* * * * *